United States Patent
Westerweel et al.

(10) Patent No.: US 9,849,935 B2
(45) Date of Patent: Dec. 26, 2017

(54) FLAT-BOTTOMED VESSEL AND A METHOD FOR CONTROLLING THE LENGTH OF AT LEAST ONE AIR CAVITY

(71) Applicant: Technische Universiteit Delft, Delft (NL)

(72) Inventors: Jerry Westerweel, Delft (NL); Thomas Jan Cornelis Van Terwisga, Delft (NL); Oleksandr Zverkhovskyi, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 15/039,636

(22) PCT Filed: Nov. 25, 2014

(86) PCT No.: PCT/NL2014/050802
§ 371 (c)(1),
(2) Date: May 26, 2016

(87) PCT Pub. No.: WO2015/080574
PCT Pub. Date: Jun. 4, 2015

(65) Prior Publication Data
US 2016/0368567 A1    Dec. 22, 2016

(30) Foreign Application Priority Data
Nov. 26, 2013   (NL) ..................... 2011841

(51) Int. Cl.
*B63B 1/38*   (2006.01)
*B63B 35/28*  (2006.01)

(52) U.S. Cl.
CPC ............... *B63B 1/38* (2013.01); *B63B 35/28* (2013.01); *B63B 2001/387* (2013.01); *Y02T 70/122* (2013.01)

(58) Field of Classification Search
CPC .... B63B 1/00; B63B 1/32; B63B 1/38; B63B 35/28
(Continued)

(56) References Cited

U.S. PATENT DOCUMENTS 3,659,542 A     5/1972 Petrov et al.
3,788,263 A  *  1/1974 McDermott ............. B63B 1/38
                                               114/67 A
(Continued)

FOREIGN PATENT DOCUMENTS

CN     2118689 U    10/1992
CN     1662414 A    8/2005
(Continued)

*Primary Examiner* — Lars A Olson
(74) *Attorney, Agent, or Firm* — St. Onge Steward Johnston and Reens, LLC

(57) ABSTRACT

A flat-bottomed vessel for transporting persons or goods, the vessel including a drag reduction system attached to the bottom of the vessel. The drag reduction system includes: two or more turbulence members extending perpendicular to the longitudinal direction of the vessel for generating an area with turbulent flow downstream to the turbulence members at the bottom of the vessel during movement. Additionally, for each turbulence member an air injector can be used to inject an air flow at or near to the turbulence members.

14 Claims, 6 Drawing Sheets

(58) Field of Classification Search
USPC .............................. 114/288, 289, 290, 67 A
See application file for complete search history.

(56) References Cited

U.S. PATENT DOCUMENTS

| | | | | |
|---|---|---|---|---|
| 4,227,475 A | * | 10/1980 | Mattox | ................... B60V 1/12 |
| | | | | 114/67 A |
| 5,000,107 A | | 3/1991 | Burg | |
| 2006/0156965 A1 | | 7/2006 | Stubblefield et al. | |

FOREIGN PATENT DOCUMENTS

| | | |
|---|---|---|
| CN | 103221300 A | 7/2013 |
| EP | 2371700 A1 | 10/2011 |
| EP | 2388188 A1 | 11/2011 |
| EP | 2617640 A1 | 7/2013 |
| FR | 2946614 A1 | 12/2010 |
| JP | S5078092 A | 6/1975 |
| JP | H10141987 A | 5/1998 |
| JP | 2011240918 A | 12/2011 |
| WO | 03095297 A1 | 11/2003 |
| WO | 2007136269 A1 | 11/2007 |

\* cited by examiner

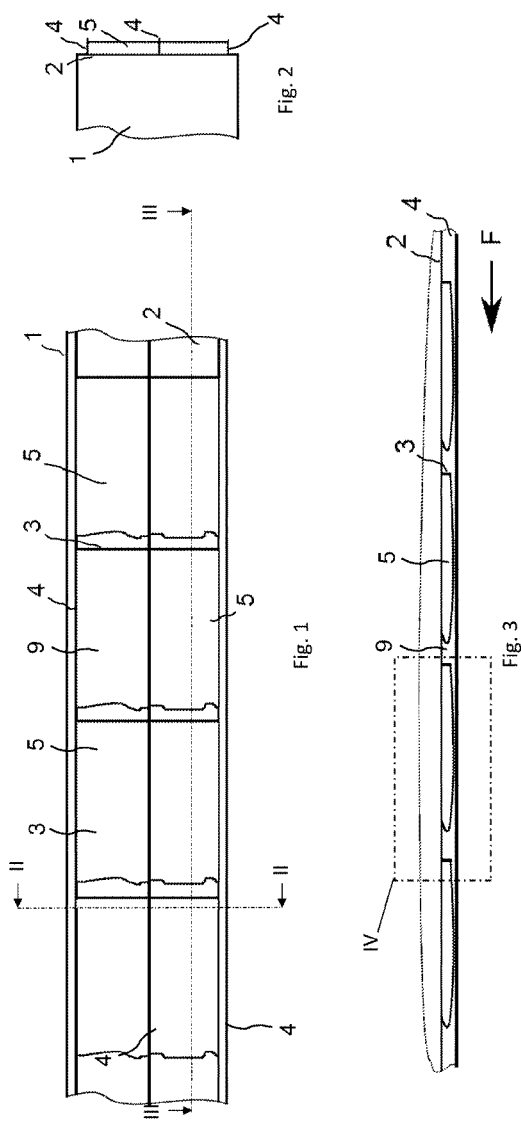

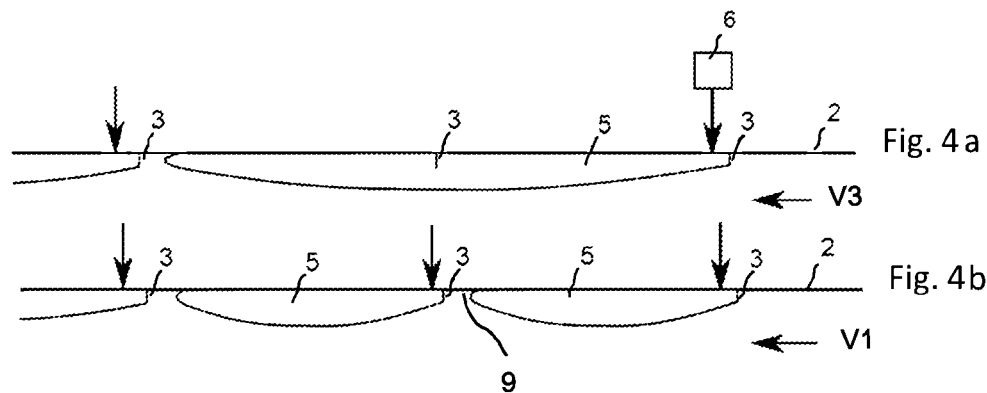
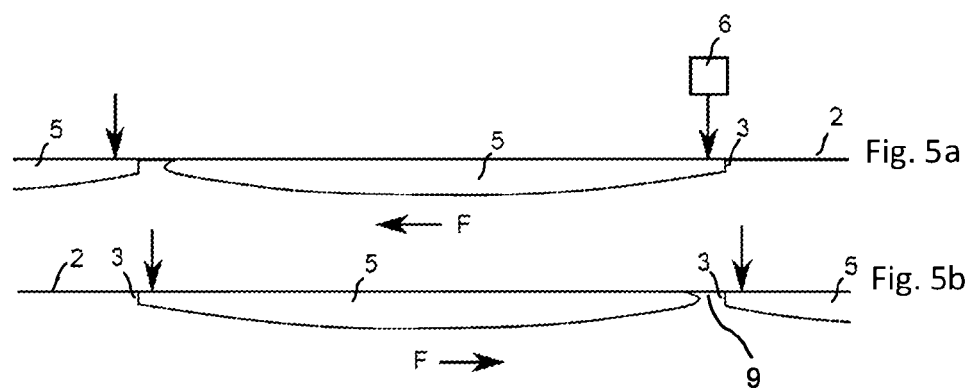

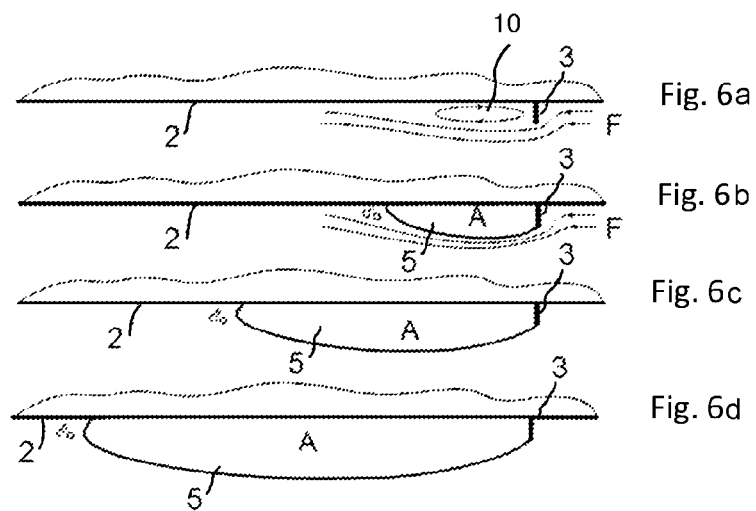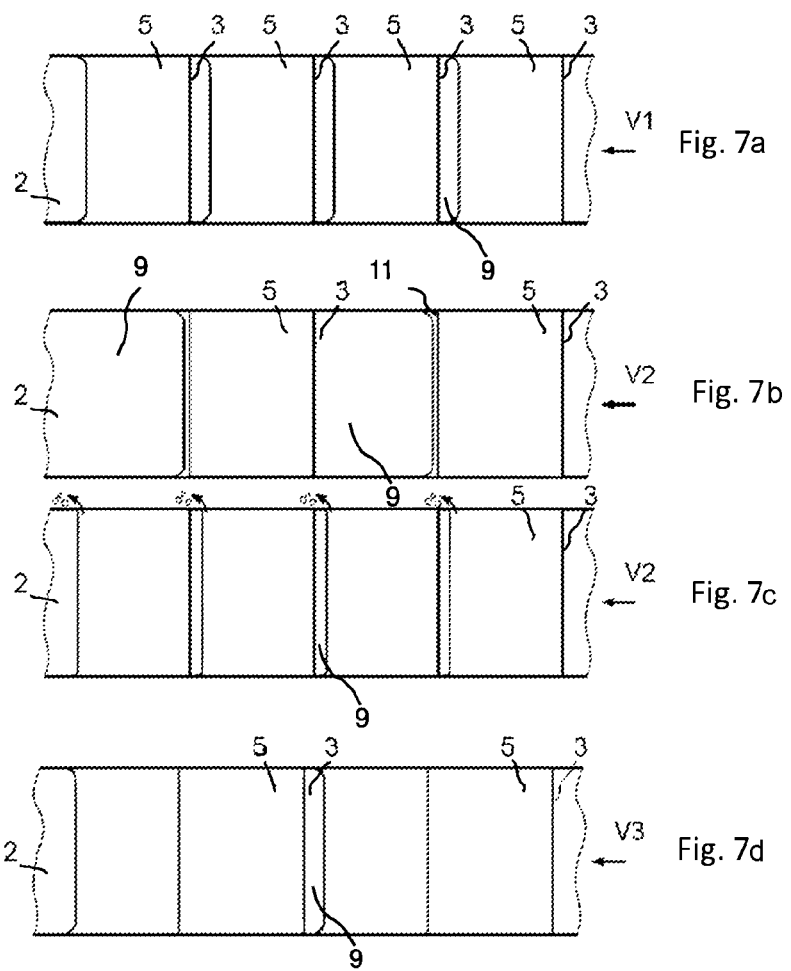

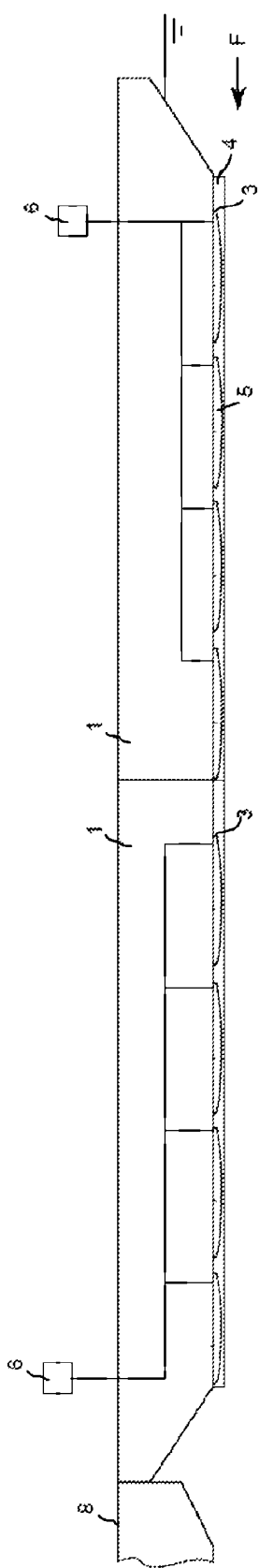

FLAT-BOTTOMED VESSEL AND A METHOD FOR CONTROLLING THE LENGTH OF AT LEAST ONE AIR CAVITY

FIELD OF THE INVENTION

The present invention relates to a flat-bottomed vessel, in particular drag reduction for a flat-bottomed vessel.

The present invention also relates to a method for controlling the length of at least one air cavity at the bottom of a flat-bottomed vessel.

BACKGROUND OF THE INVENTION

A flat-bottomed vessel is a flat-bottomed boat, built for instance for river and canal transport of heavy goods or persons. Some vessels are not self-propelled and need to be towed or pushed by towboats. Due to the large length of such vessels there is a large contact surface between the bottom of such a vessel and the water in which the vessel is placed and this large surface generates a lot of drag during movement of the vessel in the water.

It is known to provide such a flat-bottomed vessel with a drag reduction system for instance using air bubbles, such that the drag may be reduced.

Improving the efficiency of such a flat-bottomed vessel is an ongoing need felt by a skilled person in the field.

SUMMARY OF THE INVENTION

The invention provides for an improved flat-bottomed vessel for transporting persons or goods.

According to an aspect of the invention, a flat-bottomed vessel for transporting persons or goods is proposed, the vessel comprising a drag reduction system attached to the bottom of the vessel. The drag reduction system comprises two or more turbulence members extending perpendicular to the longitudinal direction of the vessel for generating an area with turbulent flow downstream to the turbulence members at the bottom of the vessel during movement thereof, and for each turbulence member an air injector adapted to inject an air flow at or near to the turbulence members. The drag reduction system further comprises a keel adjacent to both sides of the turbulence members. The bottom of the vessel is flat without cavities. The turbulence members are ridges sealingly attached to the bottom of the vessel between the keels, and the turbulence members extend 2.5-25 mm from the bottom of the vessel.

By providing a vessel according to the invention, the efficiency of the vessel is improved with only limited alterations to the vessel. To the flat-bottomed vessel only keels and ridges have to be sealingly attached and also an air supply near the ridges must be provided. Sealingly attached has to be understood as that no gap is present between the ridges and the bottom of the vessel. The supplied air creates an air bubble under the flat bottom, wherein the air bubble has the ridge and two keels as boundaries. These boundaries are easy to create on the flat bottom and at limited costs.

Hereinafter, exemplary embodiments of the invention will be described in further detail. It should be appreciated, however, that these embodiments may not be construed as limiting the scope of protection for the present invention.

In an embodiment three or more longitudinal keels are dividing the bottom of the vessel into a first section and a second section and possibly further sections. The stability of the vessel may be improved by dividing the bottom of the vessel into a first and second section. Due to the different sections the air cavity or air cavities extend(s) over a smaller part of the width of the bottom, thereby reducing the risk of the air suddenly moving from one side of the bottom to another side of the bottom.

In an embodiment each of the turbulence members extend over the width of the flat-bottomed vessel and both ends of a turbulence member end against a keel. An advantage of this embodiment is that the air cavities are generated equally over the width of the vessel which increase its stability.

In an embodiment the turbulence members placed in the first section, the second section and possibly further sections are substantially in line to each other. It is advantageous to place the turbulence members in such a relation to each other, such that air cavities in the first section are substantially equal to an air cavities in the second section.

It is noted that, when multiple air cavities are generated in the first section, multiple air cavities are generated in the second section which have substantially the same length and/or position as the air cavities in the first section. The stability of the vessel is therefore not or at least minimally influenced by the generated air cavities.

In an embodiment, the turbulence members have a width in the longitudinal direction of the vessel in the range of 0.5-5 mm. It is advantageous that the turbulence members may be realized by elements which are really small with respect to the vessel.

In an embodiment, the vessel has more than two turbulence members are provided in each of the first section, the second section or further sections at the bottom of the barge, which turbulence members are spaced at equal distances with respect to each other in the longitudinal direction of the vessel.

In another embodiment, the distances may be variable in the longitudinal direction of the vessel.

In an embodiment the air injectors are formed by apertures in the bottom of the vessel and/or in at least one of the keels, which air injectors are connected or connectable to an air pumping device for pumping air to the air injectors. It is advantageous to provide air injectors in at least one of the keels, such that no additional holes have to be made in the skin of the vessel, which makes the drag reduction system easier to attach and/or to dismount with respect to the vessel.

It is noted that conducts between the apertures and the air pumping device may be inserted in the keels as well. Further, it is noted that only one aperture per turbulence member is sufficient to provide enough air at the turbulence member to generate an air cavity over substantially the whole length of the turbulence member.

In an embodiment an air outlet is provided upstream near to a turbulence member, preferably wherein an air outlet is provided upstream near to each of the turbulence members. It is an advantage of this embodiment that the length of air cavities formed behind each turbulence member may be controlled by letting air out by the air outlet. It is therefore accomplished that the air cavity at each turbulence member may develop and is not disturbed by an air cavity realized at a foregoing turbulence member. The efficiency of the drag reduction system increases when more air cavities are realized at the bottom of the vessel, or when a larger surface of the bottom of the vessel is covered by air cavities.

In an embodiment the air outlet(s) is/are operable for selectively letting out air. When the vessel has a certain speed it may occur that an air cavity generated at a first turbulence member extends some distance beyond a subsequent turbulence member. When the air cavity just extends beyond the subsequent turbulence member, the subsequent turbulence member does not create an air cavity so that behind the subsequent turbulence member not the whole distance between the turbulence members is covered by an air cavity. When in this situation the air outlets are opened, the length of the air cavities is controlled, such that the air cavities no longer extend beyond the subsequent turbulence members.

When the vessel moves with a speed considerably higher than described above, the air cavity generated at a turbulence member that extends beyond the subsequent turbulence member, might extend to the next turbulence member and one air cavity is formed over the distance between two turbulence members. The efficiency of the drag reduction system may increase by such controlling of the length of the air cavities.

In an embodiment a sensor is provided upstream to at least one of the turbulence members, which sensor is adapted to measure at least a presence of an air cavity. It is, thereby, advantageous when a controller is provided for controlling the air injectors and/or the air outlet(s) based on a measurement performed by the sensor. In this embodiment it is possible to open or close air injectors and/or outlets based on whether it is determined that an air cavity is present upstream to a turbulence member.

It is for example possible that upstream to each turbulence member a sensor is provided for measuring the presence of an air cavity. An air cavity is generated at a first turbulence member, such that the presence of the air cavity can be measured upstream to the second turbulence member. However, when upstream to a third turbulence member no presence of an air cavity is measured, which may be caused by the air cavity generated by the first turbulence member disturbing generation of an air cavity by the second turbulence member, an air outlet upstream near the second turbulence member may be opened for letting out air. Thereafter, the sensor before the third turbulence member may measure the presence of an air cavity generated by the second turbulence member. The efficiency of the drag reduction system may increase by controlling the lengths of the air cavities and may lead to a reduction of the drag of about 10%.

In an embodiment the keels extend from the bottom of the vessel to substantially a same height, the height might be in the range of 0.05 to 0.30 m.

In another aspect the invention relates to a method for controlling the length of at least one air cavity at a bottom of a flat-bottomed vessel according to any one of the preceding claims, the method comprising the steps of:

moving the vessel at a certain speed;

injecting air at or near at least one of the turbulence members, determining the speed of the vessel and depth below the bottom of the vessel, wherein, when the vessel has a speed within a first range, air is injected at or near each of the turbulence members and air is let out upstream near to each of the turbulence members excluding the most forward turbulence member wherein the vessel has a speed within a second range that is higher than the first range, air is let out upstream at or near non-adjacent turbulence members.

Since air is not injected at every air injection, less air is needed in order to generate the air cavities. It is advantageous that less air is needed, since this leads to economic benefits.

BRIEF DESCRIPTION OF THE DRAWINGS

Aspects of the invention will be explained in greater detail by reference to exemplary embodiments of the invention shown in the drawings, in which:

FIG. 1 shows a bottom view of an embodiment of the vessel in use according to the invention;

FIG. 2 shows a cross section of the vessel of FIG. 1 according to line II-II;

FIG. 3 shows a cross section of the vessel of FIG. 1 according to line III-III;

FIGS. 4*a-b* show detail IV in FIG. 3 on a larger scale at different speeds;

FIGS. 5*a-b* show detail IV in FIG. 3 on a larger scale moving in opposite directions;

FIGS. 6*a-d* show a development of an air cavity at a bottom of a vessel;

FIGS. 7*a-d* show the vessel as in FIG. 1 at different speeds;

FIG. 12 shows two adjacent vessels in use according to the invention.

DETAILED DESCRIPTION OF THE INVENTION

Figure 8:
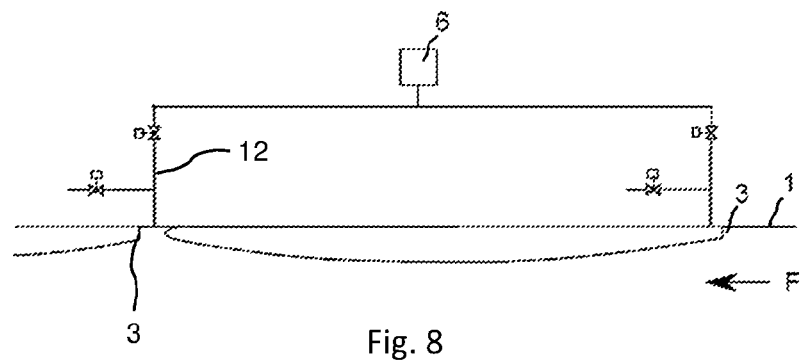
FIG. 8 shows an alternative embodiment of detail IV in FIG. 3.

Vessels, such as barges, are mainly used for transporting goods, in particular heavy goods, over water. Barges are mainly used for transport via rivers and/or canals. During movement of such a vessel through the water, forces are acted on the outer skin of the vessel in the direction of the relative flow velocity. This is called drag. An air cavity may be provided between the skin of the bottom of the vessel and the water, in order to reduce the drag. Reducing the drag leads to, e.g., fuel savings or a possible higher speed of the vessel.

Therefore, FIGS. 1, 2 and 3 show a bottom 2 of a vessel 1 according to the invention. Multiple turbulence members 3 are mounted to the bottom 2 of the vessel 1. The turbulence members 3 are spaced with respect to each other in longitudinal direction of the vessel 1. Therefore, there is sufficient space available after each of the turbulence members for development of an air cavity 5. As can be seen in FIGS. 1 and 3 in which arrow F indicates the flow direction of the water, a number of air cavities is generated, which number of air cavities does not have to correspond to the number of turbulence members 3 (see FIGS. 4*a-b*). The number of turbulence members 3 may be higher than the number of air cavities, as will be explained later on. Further, the turbulence members 3 substantially extends over half the width of the vessel and end at each side against a keel 4, as shown in FIG. 1.

A part of the bottom where no air cavity is generated may come in contact with the water. Such a part is called 'wet area' and is indicated in FIGS. 1 and 3 with reference number 9. The smaller the amount of 'wet area' at the bottom 2 of the vessel 1, the more the drag is reduced.

Further, keels 4 are provided at the bottom 2 of the vessel 1. Two keels 4 are provided at the sides of the bottom 2 and a third keel 4 is provided between this two keels 4. The keels 4 divide the bottom 2 of the vessel 1 into two sections, thereby increasing the stability of the vessel 1, as can be seen in FIG. 2.

In each of the two sections, turbulence members 3 are provided and the turbulence members 3 placed in the first section are substantially parallel to the turbulence members 3 placed in the second section. This is advantageous to the stability of the vessel 1.

Air injectors (not shown) are provided downstream to the turbulence members 3 for injecting air in flow direction F immediately behind the turbulence members 3, such that an air cavity 5 may develop as explained later on, see FIG. 6.

FIG. 4a shows detail IV in FIG. 3 on a larger scale and at a first speed and/or with a first depth of the water. An air injecting device 6 injects air in flow direction F behind a turbulence member 3. The air cavity 5 develops from the turbulence member 3 and under influence of speed V3 and the depth of the water extends beyond the subsequent turbulence member 3 as can be seen in FIG. 4a. Since the air cavity 5 extends beyond the subsequent turbulence member 3, it is not necessary to inject air at that turbulence member 3. However, air may be injected at the subsequent turbulence member 3 in order to ensure that enough air is present in the generated air cavity 5 and/or that the air cavity 5 may extend even further.

It is described and shown that an air cavity 5 generated at a turbulence member 3 extends beyond one subsequent turbulence member 3. However, the air cavity 5 may extend further beyond more than one subsequent turbulence member 3, and its extensions depends on the speed V3 and less on the amount of injected air.

FIG. 4b shows detail IV in FIG. 3 on a larger scale and at speed V1 and a depth of the water. Speed V1 is below speed V3. As can be seen in the figure, an air cavity 5 is generated downstream to every turbulence member 3. Due to speed V1, the air cavities extend over a shorter distance in comparison with FIG. 4a and therefore ends before the subsequent turbulence member 3. Thus, more air cavities are generated at speed V1 in comparison with the number of air cavities generated at speed V3. At both speeds, a big part of the surface of the bottom 2 of the vessel 1 is covered with air cavities 5, thereby reducing the drag.

FIGS. 5a and 5b show that the drag reduction system may be used in a first flow direction F, but also in a second opposite flow direction. Due to the shape of the turbulence member 3, as will be explained later on, the drag reduction system may reduce the drag in both moving directions.

In order to be able to use the drag reduction system in two different moving directions, it might be necessary to provide the possibility to inject air at either side of each turbulence member.

FIGS. 6a-d show a development of an air cavity 5 at a bottom 2 of a vessel 1. FIG. 6a may for example occur when the vessel 1 starts moving or when no air is injected yet. Due to the flow of the water encountering the turbulence member 3, an area 10 with turbulent flow is generated downstream of the turbulence member 3 over the whole length of the turbulence member 3 ending at the keels 4 at both sides of the turbulence member 3. This is caused by the shape and dimensions of the turbulence member 3, as will be described in relation to FIG. 10.

The subsequent step as shown in FIG. 6b comprising the step of injecting air in the area 10 with turbulent flow, which is immediately behind the turbulence member 3. Due to the turbulent flow, the injected air is distributed throughout substantially the whole area 10 with turbulent flow.

Due to the movement of the vessel 1 and forces applied on the air by the water, the air moves downstream, as indicated in FIG. 6c. After a certain amount of time, depending on, i.e., the speed of the vessel, which means the flow speed of the water, air injection speed and the depth below the bottom of the vessel, the air cavity 5 is fully developed and equals a half gravity wave length as may be seen in FIG. 6d.

FIGS. 7a-d show the development of air cavities at the bottom 2 of the vessel 1 and the effect of different speeds of the vessel 1. FIG. 7a relates to the situation as explained in relation to FIGS. 4b and FIG. 7d relates to situation as explained in relation to FIG. 4a.

At speed V2, which is between V3 and V1, the situation as indicated in FIG. 7b may occur. Due to the speed, the air cavity 5 generated at a turbulence member 3 just extends beyond the subsequent turbulence member 3, as indicated by part 11 of the air cavity 5. As a result, the air cavity generation at the subsequent turbulence member 3 is disturbed by the foregoing air cavity 5 and therefore no air cavity is generated at the subsequent turbulence member 3 and at least one large wet surface 9 occurs. When this situation occurs, the efficiency of the drag reduction system is reduced.

This situation may be overcome be letting out air as indicated in FIG. 7c. An air outlet (not shown) is provided upstream near each of the turbulence members 3 for letting out air of the air cavity 5 generated by the foregoing turbulence member 3. The air cavity 5 is prevented from extending just beyond the subsequent turbulence member 3, leading to that an air cavity 5 is generated downstream to every turbulence member. Therefore, the efficiency of the drag reduction system increases and the wet surfaces 9 are minimal.

An operator of the vessel 1 may be able to control the air outlet upstream to each of the turbulence members 3. It is for example possible that air is let out when the vessel is moving at a velocity within a first speed range. The first speed range may comprise the velocities leading to the situations indicated in FIGS. 7a-c. When the vessel 1 is moving at a velocity within a second speed range, air is no longer let out and the situation as indicated in FIG. 7d may occur.

Thus, the efficiency of the drag reduction system may be improved by controlling the length of the air cavities 5. As much surface of the bottom 2 of the vessel 1 as possible is covered with air cavities 5 due to controlling the length of the air cavities.

FIG. 8 shows an alternative embodiment of detail IV in FIG. 3. In this embodiment, an air outlet 12 is provided for letting out air as described in relation to FIG. 7. The air outlet 12 may be adapted to let out air directly to the surroundings, or to let out air to the air injector 6, such that air may be reused.

It is noted that the air outlet 12 may be formed by an aperture in one of the keels 4 or in the bottom 2 of the vessel 1. The air outlet 12 may be closeable or the air outlet may be controlled by means of the air injector 6. An air inlet may also be formed by an aperture in one of the keels 4 or in the bottom 2 of the vessel 1.

Figure 9:
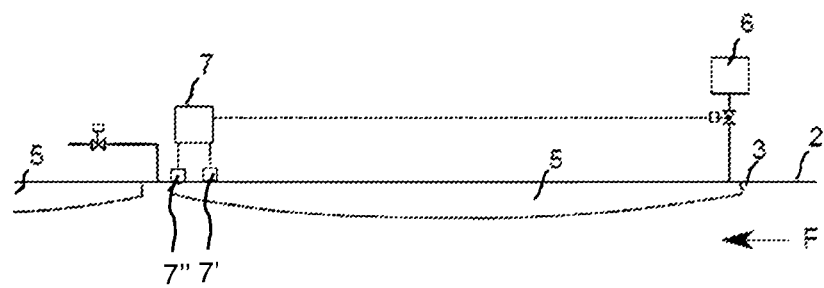
FIG. 9 shows an alternative embodiment of FIG. 8.

FIG. 9 shows an alternative embodiment of FIG. 8. In this embodiment a sensor 7 is provided upstream near to a turbulence member 3 and/or upstream to the air outlet 12. The sensor 7 measures the presence of an air cavity at the position of the first sensor 7' or second sensor 7". In the case that the first sensor 7' measures an air cavity 5 and the second sensor 7" measures no presence of an air cavity 5, this may be an indication that as much surface of the bottom 2 as possible is covered by air cavities 5.

When the first sensor 7' and the second sensor 7" measures no presence of an air cavity 5, the situation as described in relation to FIG. 7b may be applicable. The measurement(s) may be used for controlling the air outlet(s)

12 to let out air or to close the air outlet(s) 12. The measurement(s) may be used also for controlling the air injector 6 by means of a controller (not shown), in order to adjust the amount of air injected, in order to accomplish a situation as described in relation to one of the FIGS. 7a, 7c and 7d.

It is noted that the sensors 7' and 7" may be, e.g., an optical sensor, an ultrasound sensor, a capacitive sensor, etc.

Figures 10A, 10B, 10C:
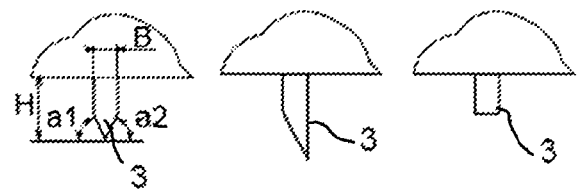
FIGS. 10*a-c* show embodiments of the turbulence member.

FIGS. 10a-c show different possible embodiments of the turbulence member 3. Referring to FIG. 10a, the turbulence member 3 comprises an in cross-section triangular part, which triangular part is in the form of an isosceles triangle. Referring to FIG. 10b, the turbulence member 3 comprises an in cross-section triangular part, which triangular part is in the form of a right-angled triangle. Referring to FIG. 10c, a side of the turbulence member facing away from the bottom of the vessel is substantially flat. For some embodiments, it applies that B is smaller than 5 mm, H is in the range of 2.5-25 mm, and a1 and a2 provide a separation edge with an angle below 90 degrees.

It is noted that in some embodiments the width of a turbulence member may be smaller than the height of a turbulence member. In other embodiments the ratio between the width of a turbulence member and the height of a turbulence member may be 1:1. In yet other embodiments, the width of a turbulence member may extend to 30 mm, or possibly to 20 mm.

In the described embodiments it is indicated that the turbulence members 3 end against the keels 4. In other embodiments there might be a gap between the end of the turbulence member 3 and the keel 4, this gap might be smaller than 0.2 m or possibly smaller than 0.1 m.

Figures 11A, 11B, 11C, 11D:
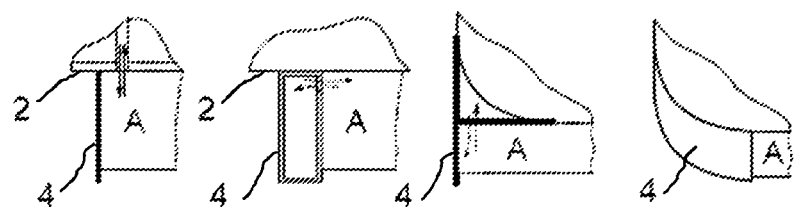
FIGS. 11*a-d* show embodiments of the keel.

FIGS. 11a-d show possible embodiments of keels 4. FIG. 11a shows a simple plate used as a keel. As indicated by the arrows in FIG. 11a, the air outlet and inlet may be provided in the bottom 2 of the vessel 1. FIGS. 11b-d) show that different kinds of hollow constructions may be used as keel 4. One or more air outlets may be provided in the keels in order to control the length of the air cavity 5 as described above. The same applies for air injectors.

In the shown embodiments the keels 4 extend a distance from the bottom 2. This distance might be in the range of 0.05 to 0.30 or 0.40 m.

FIG. 12 shows two barges 1, which are pushed by a push boat 8. At the bottom of each of the barges 1 a number of turbulence members 3 is provided, wherein an air injector is provided downstream to each turbulence member 3. Further, keels 4 are provided with are connected to the sides of the turbulence members 3, such that a generated air cavity is enclosed by a turbulence member 3 and two keels 4.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral.

The invention is not restricted to the above-described embodiments, which can be varied in a number of ways within the scope of the claims. It is, for example possible that the air injectors inject air to each cavity at a different pressure. For example, when a vessel moves with a pitch angle, the pressure in the first cavity is different than in the last one (the same with the heel). During operation different combinations of active air injectors may be arranged. For example, when all the cavities are developed the system may inject air only upstream to the first turbulence members.

It is further noted that the vessel may be a self-propelled barge or a barge which needs to be pushed by a push boat. It is also possible that the vessel is a cruise ship.

Furthermore, it is noted that the turbulence members and/or keels may be attached to a flexible sheet. The sheet might be attached or attachable to the outer skin of the vessel. It is also possible that the turbulence members that are located close to the bow might be spaced at different distances, for example large distances, compared to the following turbulence members, due to the local changes in the flow near the bow.

With respect to the turbulence member, the turbulence member may be an object that creates a separation of the flow. In practice, it may be an angular profile welded to the bottom. A turbulence member may also be formed by a weld attached to the bottom of the vessel or originating from welding together different components of the vessel. In the case that a turbulence member is formed by a weld, a downstream side of the weld may be grinded, such that a step is formed at the downstream side of the weld. It is also possible, that a groove is grinded into the weld such that a step is formed.

The invention claimed is:

1. A flat-bottomed vessel for transporting persons or goods, the vessel comprising a drag reduction system attached to the bottom of the vessel,
   wherein the drag reduction system comprises:
      at least two turbulence members extending perpendicular to the longitudinal direction of the vessel for generating an area with turbulent flow downstream to the turbulence members at the bottom of the vessel during movement thereof,
      for each turbulence member an air injector adapted to inject an air flow at or near to the turbulence members, and
      a keel adjacent to both sides of the turbulence members,
      wherein the bottom of the vessel is flat without cavities and the turbulence members are ridges sealingly attached to the bottom of the vessel between the keels,
   wherein the turbulence members extend 2.5-25 mm from the bottom of the vessel, and
   wherein the keels extend from the bottom of the vessel to substantially a same height, in the range of 0.05 to 0.30 m.

2. The vessel according to claim 1, wherein the bottom of the vessel comprises three or more longitudinal keels dividing the bottom of the vessel into at least a first section and a second section.

3. The vessel according to claim 1, wherein two or more turbulence members extend over the width of the flat-bottomed vessel and both ends of the turbulence members end against a keel.

4. The vessel according to claim 3, wherein the turbulence members placed in the first section, the second section are substantially in line with each other.

5. The vessel according to claim 1, wherein the turbulence members have a width in the longitudinal direction of the vessel in the range of 0.5-5 mm.

6. The vessel according to claim 1, wherein more than two turbulence members are provided in each of the first section, the second section or further sections at the bottom of the vessel, which turbulence members are spaced at equal distances with respect to each other in the longitudinal direction of the vessel.

7. The vessel according to claim 1, wherein the air injectors are provided downstream to each of the turbulence members.

8. The vessel according to claim 7, wherein the air injectors are formed by apertures in the bottom of the vessel, which air injectors are connected or connectable to an air pumping device for pumping air to the air injectors.

9. The vessel according to claim 1, wherein an air outlet is provided upstream near to a turbulence member.

10. The vessel according to claim 9, wherein the air outlet is operable for selectively letting out air.

11. A flat-bottomed vessel for transporting persons or goods, the vessel comprising a drag reduction system attached to the bottom of the vessel,
   wherein the drag reduction system comprises:
      at least two turbulence members extending perpendicular to the longitudinal direction of the vessel for generating an area with turbulent flow downstream to the turbulence members at the bottom of the vessel during movement thereof,
      for each turbulence member an air injector adapted to inject an air flow at or near to the turbulence members, and
      a keel adjacent to both sides of the turbulence members,
   wherein the bottom of the vessel is flat without cavities and the turbulence members are ridges sealingly attached to the bottom of the vessel between the keels,
   wherein the turbulence members extend 2.5-25 mm from the bottom of the vessel, and
   wherein a sensor is provided upstream to at least one of the turbulence members, which sensor is adapted to measure at least a presence of an air cavity.

12. The vessel according to claim 11, wherein a controller is provided for controlling the air injectors based on a measurement performed by the sensor.

13. A method for controlling the length of at least one air cavity at a bottom of a flat-bottomed vessel, the vessel comprising a drag reduction system attached to the bottom of the vessel,
said drag reduction system further comprising at least two turbulence members extending perpendicular to the longitudinal direction of the vessel for generating an area with turbulent flow downstream to the turbulence members at the bottom of the vessel during movement thereof,
   for each turbulence member an air injector adapted to inject an air flow at or near to the turbulence members,
a keel adjacent to both sides of the turbulence members,
wherein the bottom of the vessel is flat without cavities and the turbulence members are ridges sealingly attached to the bottom of the vessel between the keels,
the turbulence members extend 2.5-25 mm from the bottom of the vessel,
the method comprising the steps of:
   moving the vessel at a certain speed;
   injecting air at or near at least one of the turbulence members,
   determining the speed of the vessel and depth below the bottom of the vessel,
wherein, when the vessel has a speed within a first range, air is injected at or near each of the turbulence members and air is let out upstream near to each of the turbulence members excluding the most forward turbulence member, and
wherein, when the vessel has a speed within a second range that is higher than the first range, air is let out upstream at or near non-adjacent turbulence members.

14. The vessel according to claim 1, further comprising an air outlet provided upstream of each of the turbulence members excluding the most forward turbulence member.

* * * * *